(12) United States Patent
Li et al.

(10) Patent No.: US 6,937,776 B2
(45) Date of Patent: Aug. 30, 2005

(54) METHOD, SYSTEM, AND COMPUTER PROGRAM PRODUCT FOR COMPUTER-AIDED DETECTION OF NODULES WITH THREE DIMENSIONAL SHAPE ENHANCEMENT FILTERS

(75) Inventors: Qiang Li, Clarendon Hills, IL (US); Kunio Doi, Willowbrook, IL (US)

(73) Assignee: University of Chicago, Chicago, IL (US)

( * ) Notice: Subject to any disclaimer, the term of this patent is extended or adjusted under 35 U.S.C. 154(b) by 0 days.

(21) Appl. No.: 10/355,147

(22) Filed: Jan. 31, 2003

(65) Prior Publication Data

US 2004/0151356 A1 Aug. 5, 2004

(51) Int. Cl.[7] .................................................. G06F 9/40
(52) U.S. Cl. ..................................... 382/260; 382/131
(58) Field of Search ................................ 382/128–134, 382/181, 260, 263–266, 275, 286; 378/62, 15; 435/6; 600/407, 425

(56) References Cited

U.S. PATENT DOCUMENTS

| | | | |
|---|---|---|---|
| 4,851,984 A | | 7/1989 | Doi et al. ............... 364/443.23 |
| 5,289,374 A | * | 2/1994 | Doi et al. .................... 600/407 |
| 5,319,549 A | * | 6/1994 | Katsuragawa et al. ...... 382/108 |
| 5,807,256 A | * | 9/1998 | Taguchi et al. ............. 600/425 |
| 5,848,198 A | * | 12/1998 | Penn .......................... 382/276 |
| 5,987,094 A | * | 11/1999 | Clarke et al. ................. 378/62 |
| 6,078,680 A | | 6/2000 | Yoshida et al. ............. 382/128 |
| 6,138,045 A | * | 10/2000 | Kupinski et al. ........... 600/425 |
| 6,272,200 B1 | * | 8/2001 | Pan et al. ...................... 378/15 |
| 6,646,641 B1 | * | 11/2003 | White et al. ................. 345/428 |
| 6,690,816 B2 | * | 2/2004 | Aylward et al. ............ 382/128 |

OTHER PUBLICATIONS

Hsieh et al., "Projection Space Image Reconstruction Using Strip Functions . . . ", IEEE Transactions on Medical Imaging vol. 17, No. 1, Feb. 1998, pp. 24–44.*

Ukai et al., "A coronary Calcification Daignosis System Based on Helical CT images", IEEE Transactions on Nuclear Science, vol. 45, No. 6, Dec. 1998, pp. 3083–3088.*

Yu–Lung Hsieh, et al. "Projection Space Image Reconstruction using Strip Functions to Calculate Pixels More "Natural" for Modeling the Geometric Response of the SPECT Collimator", IEEE 1998 Transactions on Medical Imaging, vol. 17, No. 1, Feb. 1998, pp. 24–44.

* cited by examiner

*Primary Examiner*—Yon J. Couso
(74) *Attorney, Agent, or Firm*—Oblon, Spivak, McClelland, Maier & Neustadt, P.C.

(57) ABSTRACT

A method, system, and computer program product for evaluating an image including an object, including filtering image data derived from the image with a first geometric enhancement filter having magnitude and likelihood filter components so as to produce first filtered image data in which a first geometric pattern is enhanced. Thereafter the filtered image data can be subjected to processing to derive a measure indicative of the presence of the object in the image, including determining a region of interest in the image, extracting at least one feature from the first filtered image data from within the region of interest, and applying the at least one extracted feature to a classifier configured to output the measure indicative of the presence of the object in the image. The image data can also be subjected to filtering with second and/or third geometric filters which enhance different geometric patterns, and which produce respective filtered data which are also processed to derive the measure indicative of the presence of the object.

41 Claims, 13 Drawing Sheets

THE OVERALL SCHEME FOR NODULE DETECTION IN 3-D HRCT IMAGES BY USE OF THE THREE ENHANCEMENT FILTERS FOR DOT, LINE, AND PLANE.

THREE BASIC OBJECTS, A DOT, A LINE, AND A PLANE, IN A 3-D IMAGE SPACE.

THE OVERALL SCHEME FOR NODULE DETECTION IN 3-D HRCT IMAGES BY USE OF THE THREE ENHANCEMENT FILTERS FOR DOT, LINE, AND PLANE.

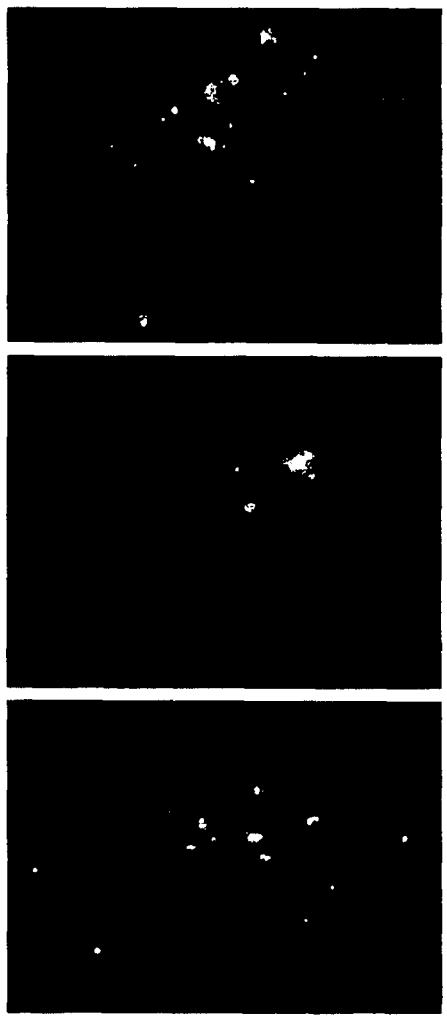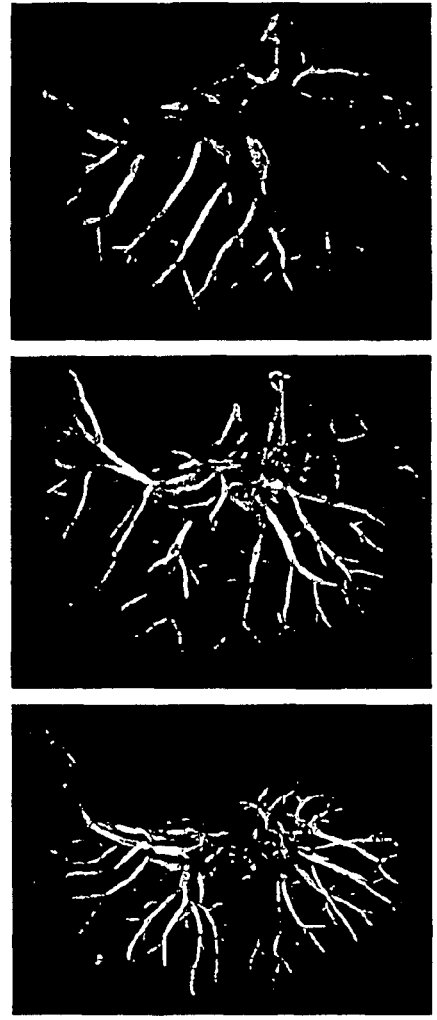
FIG. 4A
FIG. 4B

FIG.7A
FIG.7B

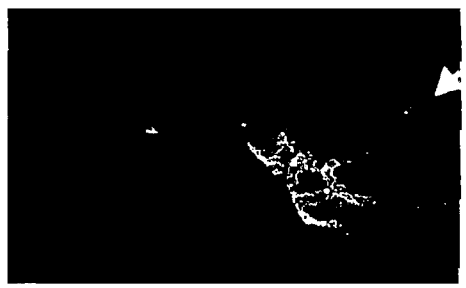
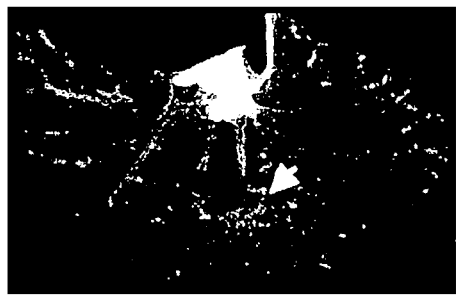
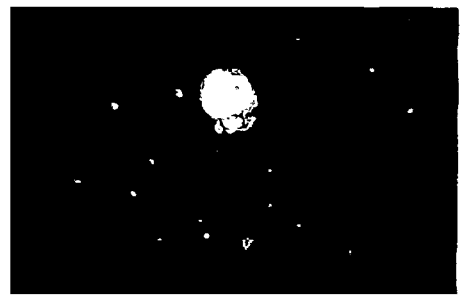
FIG.10A  FIG.10B

US 6,937,776 B2

METHOD, SYSTEM, AND COMPUTER PROGRAM PRODUCT FOR COMPUTER-AIDED DETECTION OF NODULES WITH THREE DIMENSIONAL SHAPE ENHANCEMENT FILTERS

The present invention was made in part with U.S. Government support under USPHS grants CA62625 and CA64370. The U.S. Government may have certain rights to this invention.

BACKGROUND OF THE INVENTION

FIELD OF THE INVENTION

A method, system, and computer program product for computer aided detection (CAD) of lung cancer and other malignant nodules with a reduced false positive rate.

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348; 6,240,201; 6,282,305; 6,282,307; 6,317,617; 6,335,980; 6,363,163; 6,442,287; 6,470,092 as well as U.S. patent applications Ser. Nos. 08/173,935; 08/398,307 (PCT Publication WO 96/27846); 08/536,149; 08/900,189; 09/692,218; 09/759,333; 09/760,854; 09/773,636; 09/816,217; 09/830,562; 09/818,831; 09/842,860; 09/830,574; 09/842,860; 09/881,002; 09/990,310; 09/990,311; 09/990,377; 10/036,541; 10/078,694; 10/097,820; 10/097,727; 10/120,420; 10/126,523; 10/198,141; 10/223,442; 10/231,064; 10/270,674; 60/160,790; 60/176,304; 60/329,322; 60/331,995; 60/332,005; 60/354,523 and 60/395,305; and PCT patent applications PCT/US98/15165; PCT/US98/24933; PCT/US99/03287; PCT/US00/41299; PCT/US01/00680; PCT/US01/01478; PCT/US01/01479; PCT/US01/08626; PCT/US01/43146; PCT/US02/06638; PCT/US02/16018; and PCT/US02/31578; and co-pending application attorney docket number 229350US; all of which are incorporated herein by reference.

The present invention includes use of various technologies referenced and described in the above-noted U.S. Patents and Applications, as well as described in the references identified in the following LIST OF REFERENCES. Author(s) and year of publication are cross referenced throughout the specification by reference to the respective number, in parenthesis, of the reference:

LIST OF REFERENCES

1. S. H. Landis, T. Murray, S. Bolden, and P. A. Wingo. Cancer statistics 2000. CA Cancer J Clin. 50:7–33, 2000.
2. Cancer facts and figures 2001, American Cancer Society, http://www.cancer.org.
3. SEER cancer statistics review 1973–1999, National Cancer Institute, http://seer.cancer.gov/csr/1973–1999.
4. S. Sone, S. Takashima, F. Li, Z. Yang, T. Honda, Y. Maruyama, M. Hasegawa, T. Yamanda, K. Kubo, K. Hanamura, and K. Asakura. Mass screening for lung cancer with mobile spiral computed tomography scanner. Lancet 351(9111):242–245, 1998.
5. M. Takizawa, S. Sone, S. Takashima, F. Li, Y. Maruyama, M. Hasegawa, K. Hanamura, and K. Asakura. The mobile hospital- an experimental telemedicine system for the early detection of disease. Journal of Telemedicine and Telecare 146–151, 1998.
6. Kawakami and T. Honda. Characteristics of small lung cancers invisible on conventional chest radiography: analysis of 44 lung cancers detected by population-based screening using low-dose spiral CT. The British Journal of Radiology 73:137–145, 2000.
7. S. Sone, F. Li, Z. Yang, T. Honda, Y. Maruyama, S. Takashima, M. Hasegawa, S. Kawakami, K. Kubo, M. Haniuda, and T. Yamada. Results of three-year mass screening programme for lung cancer using mobile low-dose spiral computed tomography scanner. British Journal of Cancer 84:25–32, 2001.
8. C. I. Henschke, D. I. McCauley, D. F. Yankelovitz, D. P. Naidich, G. McGuinness, O. S. Miettinen, D. M. Libby, M. W. Pasmantier, J. Koizumi, N. K. Altorki, and J. P. Smith. Early lung cancer action project: overall design and findings from baseline screening. Lancet 354: 99–105, 1999.
9. M. L. Giger, K. Doi, and H. MacMahon. Image feature analysis and computer-aided diagnosis in digital radiography. 3. Automated detection of nodules in peripheral lung fields. Med. Phys. 15:158–166, 1988.
10. M. L. Giger, K. Doi, H. MacMahon, C. Metz, and F. F. Yin. Pulmonary nodules: Computer-aided detection in digital chest images. Radiographics 10:41–51, 1990.
11. X. Xu, K. Doi, T. Kobayashi, H. MacMahon, and M. L. Giger. Development of an improved CAD scheme for automated detection of lung nodules in digital chest images. Med. Phys. 24:1395–1403, 1997.
12. A. Shimizu, J. Hasegawa, and J. Toriwaki. Minimum directional difference filter, a digital filter developed for the extraction of circumscribed shadows, and its characteristics. IEICE Trans. J-76D-11: 241–249, 1993.
13. T. Okumura, T. Miwa, J. Kako, S. Yamamoto, M. Matsumoto, Y. Tateno, T. Iinuma, and T. Matsumoto. Variable N-Quoit filter applied for automatic detection of lung cancer by X-ray CT. Computer-Assisted Radiology, H. U. Lemke, M. W. Vannier, K. Inamura, and A. Farman (editors), 242–247, Elsevier Science, 1998.
14. Y. Lee, T. Hara, H. Fujita, S. Itoh, and T. Ishigaki. Automated detection of pulmonary nodules in helical CT images based on an improved template-matching technique. IEEE Trans. Med. Imag. 20:595–604, 2001.
15. A. G. Armato, M. L. Giger, C. Moran, J. T. Blackburn, K. Doi, and H. MacMahon. Computerized detection of pulmonary nodules on CT scans. RadioGraphics 19:1303–1311, 1999.
16. K. Kanazawa, Y. Kawata, N. Niki, H. Satoh, H. Ohmatsu, R. Kakinuma, M. Kaneko, K. Eguchi, N. Moriyama. Computer aided diagnostic system for pulmonary nodules based on helical CT images. Computer-Aided Diagnosis in Medical Imaging, K. Doi, H. MacMahon, M. L. Giger, and K. R. Hoffmann (editors), 131–136, Elsevier Science, 1999.
17. M. S. Brown, M. F. McNitt-Gary, J. G. Goldin, R. D. Suh, J. W. Sayre, and D. R. Aberle. Patient-specific models for lung nodule detection and surveillance in CT images. IEEE Trans. Med. Imag. 20:1242–1250, 2001.
18. L. Fan, C. L. Novak, J. Qian, G. Kohl, and D. P. Naidich, Automatic detection of lung nodules from multi-slice low-dose CT images. Proc. of SPIE Conf. on Medical Imaging 4322:1828–1935, 2001.
19. T. M. Koller, G. Gerig, G. Szekely, and D. Dettwiler. Multiscale detection of curvilinear structures in 2-D and 20. C. Lorenz, I.-C. Carlson, T. M. Buzug, C. Fassnacht, and J. Weese.Multi-scale line segmentation with automatic estimation of width, contrast and tangential direction in 2D and 3D medical images. First Joint Conf. Computer Vision, Virtual Reality and Robotics in Medicine, and Medical Robotics and Computer-Assisted Surgery, 233–242, Springer, 1997.
21. A. F. Frangi, W. J. Niessen, R. M. Hoogeveen, T. van Walsum, M. A. Viergever. Model-based quantitation of 3-D magnetic resonance angiographic images, IEEE Trans. on Med. Imag. 18:946–956, 1999.
22. W. H. Press, B. P. Flannery, S. A. Teukolsky, and W. T. Vetterling. Numerical Recipes: The Art of Scientific Computing, 498–546, Cambridge University Press, 1986.
23. J. Koenderink. The structure of images. Biological Cybernetics 50:363–370, 1984.
24. T. Lindeberg. Scale-space theory in computer vision. Kluwer Academic Publishers, 1994.
25. T. Lindeberg. On scale selection for differential operators. Proc. $8^{th}$ Scandinavian Conf. On Image Analysis, 857–866, 1993.
26. K. Nakamura, H. Yoshida, R. Engelmann, H. MacMahon, S. Katsuragawa, T. Ishida, K. Ashizawa, and K. Doi. Computerized analysis of the likelihood of malignancy in solitary pulmonary nodules with use of artificial neural networks. Radiology 214:823–830, 2000.
27. K. Ashizawa, T. Ishida, H. MacMahon, C. Vyborny, S. Katsuragawa, and K. Doi. Artificial neural networks in chest radiography: Application to the differential diagnosis of interstitial lung diseases. Acad. Radiol. 6:2–9, 1999.

DISCUSSION OF THE BACKGROUND

Lung cancer is the leading cause of deaths in the U.S. among all types of cancers. It causes more than 150,000 deaths in the U.S. each year (references 1–3), which is more than the total number of deaths resulting from colon cancer, breast cancer, and prostate cancer combined. Early detection and treatment of lung cancer are effective ways to improve the survival rate, and have been attempted in the U.S. and Japan since 1996 by use of computed tomography (CT) (references 4–8). A problem in the use of CT for lung cancer screening is the large volume of data for radiologists to read. There are typically more than 30 sections (images) to be read in each case, and this number may be increased to hundreds if high-resolution CT is employed. This amount of data not only results in high costs due to the long time it takes a radiologist to evaluate the data, but may also lead to missed cancer identification/detection because it is difficult to find a suspicious area in a large amount of data.

A computer-aided detection (CAD) scheme for detection of lung nodules is an effective method of assisting radiologists in the detection of nodules in chest radiographs (references 9–12) and thoracic CT scans (references 13–18). An important and difficult problem in CAD schemes for nodule detection is the initial selection/detection of nodule candidates. Most of the known CAD schemes employ a thresholding technique (or its equivalent) to segment nodule candidates from background in the initial detection stage. In some CAD schemes, the thresholding technique is applied directly to original images (references 15–18) whereas in other schemes, a nodule enhancement filter is employed as a pre-processing step prior to the application of the thresholding technique (references 9–14). For initial nodule detection in chest radiographs, the application of a nodule enhancement filter is used because of the complicated background patterns caused by rib structures and blood vessels, which may overlap with nodules in space, and may have pixel values similar to those of nodules. In CT images, sometimes it is possible to exclude this pre-processing step (references 15–18), because the lung field is relatively uniform compared with that in chest radiographs. However, the inventors have determined that thresholding the original CT images without proper filtering results in the following difficulties:

(1) Some nodules, especially those with ground-glass opacity (GGO), may have very low CT values and contrast, which make the proper selection of a threshold very difficult. Although the use of a low threshold level may enable the segmentation of these kinds of nodules, the number of false-positives will be increased substantially;

(2) Many nodules have CT values similar to those of blood vessels and airway walls, which implies that many false-positives due to vessels and airway walls will be included as nodule candidates in the detection of these nodules; and (3) Nodules may be connected to blood vessels and airway walls, which further complicate the task of nodule detection because nodules need to be separated from those normal anatomic structures in subsequent stages.

Thus, filtering is required.

However, the inventors have determined that not all nodule enhancement filters work well for the purpose of initial nodule detection. In fact, many of them are not effective in the sense that they enhance not only nodules, but also anatomic structures such as vessels, airway walls, and ribs. In other words, these pre-processing filters have a good sensitivity but a poor specificity for nodule-like patterns. None of the papers cited above, which represent the majority of results for CAD research, employs criteria of both sensitivity and specificity as a guide for the construction of a nodule enhancement filter. Although the filters proposed in Shimizu (reference 12) and Okumura (reference 13) have relatively good specificity compared with the others, they still lack adequate discriminatory power to distinguish spherical nodules from elongated nodules. For example, when the diameter of a circle (nodule-like object) is equal to the long axis of an ellipse regardless of its short axis (elongated object if the short axis is small), then the filter in Shimizu will output the same responses for these two different objects. The same is true for the Quoit filter in Okumura.

What is required, as discovered by the present inventors, is enhancement filters to be used with CAD systems that are configured to address the above-described limitations.

SUMMARY OF THE INVENTION

An object of the present invention is a method for cancer detection characterized by good initial detection of a majority of nodules while simultaneously maintaining a minimum number of false-positives.

Thus, the present invention is directed to a method, system, and computer program product for detecting nodules included in a medical image that includes identifying plural regions of interest (ROIs) in the image and smoothing a subset of the image corresponding to the ROIs. These image subsets are filtered with a geometric enhancement filter so as to produce an enhanced image subset which is analyzed with an artificial neural network to identify the presence of either a malignant or a non-malignant object.

Two criteria, namely, sensitivity and specificity, are used in the design of an enhancement filter to provide a goal for the construction of an enhancement filter. Two separate components, i.e., magnitude and likelihood, are used to compose an enhancement filter. The magnitude component corresponds to a measure of whether an object exists, and the likelihood component corresponds to the probability that an object belongs to a specific shape to be enhanced. The combination of the two components that enables the enhancement filters of the present invention to achieve a good sensitivity and a good specificity simultaneously.

BRIEF DESCRIPTION OF THE DRAWINGS

A more complete appreciation of the present invention and many of the attendant advantages thereof will be readily obtained as the same becomes better understood by reference to the following detailed descriptions and accompanying drawings:

FIGS. 4a–4c are illustrations of a maximum intensity projection of enhanced images using a multi-scale nodule enhancement filter, a single-scale line enhancement filter, and a single-scale plane enhancement filter, respectively;

FIGS. 7a–7b are illustrations of the comparison of original sections and the plane-enhanced sections for the three nodules shown in FIGS. 3a–3c;

FIGS. 10a–10c are illustrations of the comparison of three original sections with a nodule indicated by an arrow, 2-D dot-enhanced images, and 2-D line-enhanced images, respectively.

DETAILED DESCRIPTION OF THE PREFERRED EMBODIMENTS

The construction of three enhancement filters of the present invention is based on three kinds of idealized basic shapes, i.e., dot, line, and plane, in three-dimensional (3-D) image space. These shapes are the simplified representations of nodules, blood vessels, and airway walls in thoracic CT images. Requirements for each of the enhancement filters are that a large response is produced for one specific basic shape, and a small output is provided for the other two basic shapes. Therefore, each of these filters has a good sensitivity and a good specificity for one of the three basic shapes. The filters are based on the eigenvalue analysis of the Hessian matrix at each location in 3-D image space, which originated in Koller (reference 19) and was further developed in Lorenz and Franzi (references 20 and 21, respectively) for the purpose of vessel enhancement. The vessel enhancement filters employed in these references are likely to produce a large response for a sphere, which means that these filters do not have a good specificity for the enhancement of blood vessels.

In thoracic CT images, three types of objects (nodules, vessels, and airway walls) have relatively large CT values in the lung field. These objects may be approximated by a sphere, a number of piece-wise cylinders, and a number of piece-wise sheets, respectively. In order to simplify the construction of the three enhancement filters for nodules, vessels, and airway walls, the present invention assumes that a sphere, a cylinder, and a sheet may be represented, respectively, by the following three equations where σ represents a size parameter:

$$s(x, y, z) = \exp\left\{-\frac{x^2 + y^2 + z^2}{2\sigma^2}\right\}, \quad (1)$$

$$c(x, y, z) = \exp\left\{-\frac{x^2 + y^2}{2\sigma^2}\right\},$$

$$h(x, y, z) = \exp\left\{-\frac{x^2}{2\sigma^2}\right\}.$$

Figure 1:
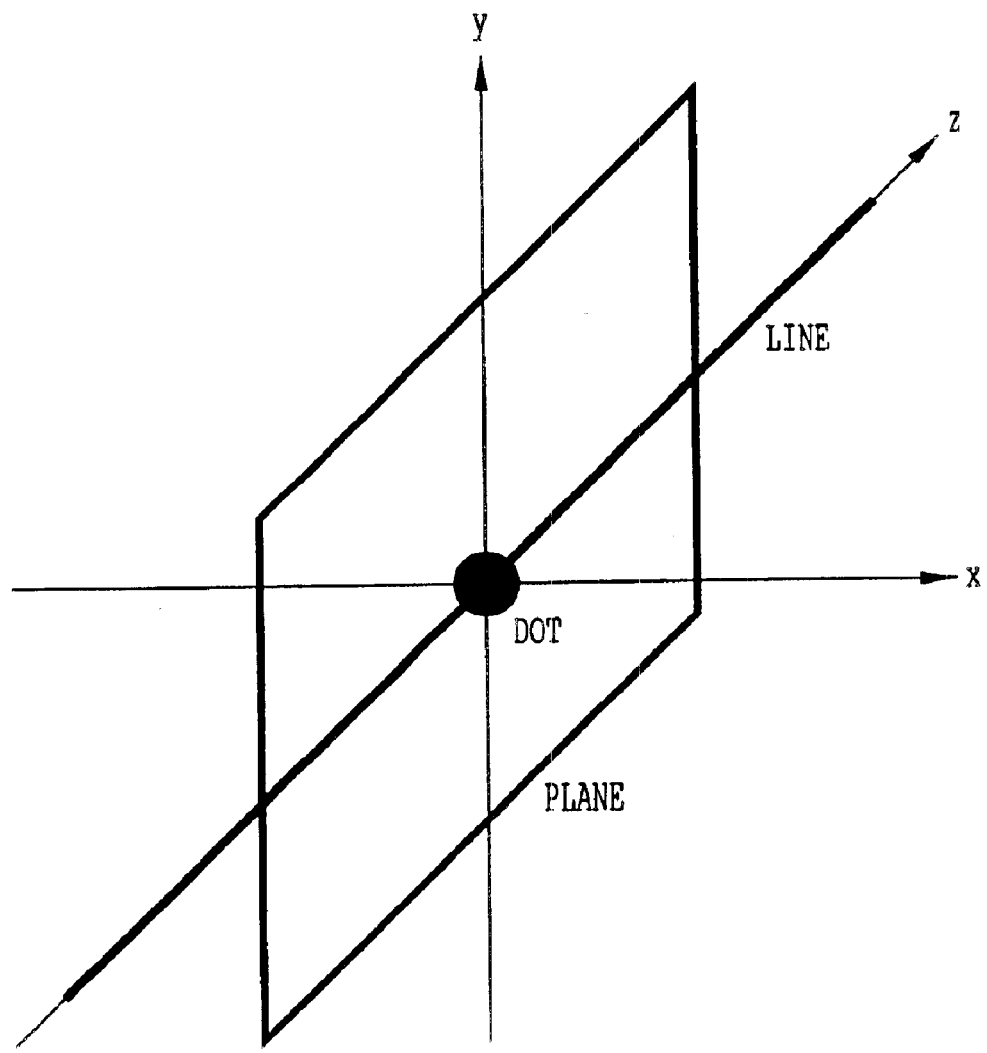
FIG. 1 is an illustration of the three basic shapes (a dot, a line, and a plane) in 3-D image space.

Here, $s(x,y,z)$ is a "fuzzy" sphere in the form of a 3-D Gaussian function, $c(x,y,z)$ is a "fuzzy" cylinder lying on the z axis in which any plane perpendicular to the z axis is a 2-D Gaussian function, and $h(x,y,z)$ is a "fuzzy" sheet lying on the y-z plane in which any line perpendicular to the y-z plane is a 1-D Gaussian function. These "fuzzy" shapes are used because they are continuous and second-order differentiable functions, which are convenient for the design of the three enhancement filters. When the scale (or thickness) of the Gaussian functions is reduced to an infinitesimally small size, a sphere, a cylinder, and a sheet become a dot, a line, and a plane, respectively, as shown in FIG. 1. Therefore, a sphere, a cylinder, and a sheet may be decomposed into two components, namely, (1) a center dot, a center line and a center plane, respectively, and (2) a thickness. Therefore, the filters constructed are characterized as enhancement filters for dot, line, and plane in 3-D space. Because a dot, a line, and a plane represent 0-, 1-, and 2-D, respectively, basic shapes in 3-D image space, the enhancement filters for dot, line, and plane are used for the enhancement and differentiation of the basic shapes. In principle, the enhancement filters for dot, line, and plane constructed by use of the above three "fuzzy" shapes also work well for their respective "solid" shapes.

While Gaussian functions are used here to approximate the shapes desired in the filters, other embodiments using alternative distribution functions that result in the desired shapes are possible.

In the design of a filter for the enhancement of a specific basic shape (dot, line, or plane), the following two criteria are used:

(1) Sensitivity, which measures how sensitive a filter is to the shape to be enhanced (for example, a good dot enhancement filter will output a strong response for a dot relative to the other two shapes and, thus, the higher the sensitivity, the better the filter); and (2) Specificity, which indicates how specific a filter is to the shape to be enhanced (for example, a good dot enhancement filter will not output a strong response for a line or a plane and, thus, the higher the specificity, the better the filter).

Sensitivity and specificity are generally contradictory concepts which are traded off when designing filters. It is straightforward to design a filter with a high sensitivity (or specificity) regardless of its specificity (or sensitivity) or vice versa. An object of the present invention, however, is the construction of filters for a dot, a line, and a plane each with both good sensitivity and good specificity.

A differential geometric method of filter design (more specifically, second derivatives) is used to design the enhancement filters. Different from the first derivatives such as a gradient operator which are generally suitable for the enhancement of the edge of an object, the second derivatives are generally suitable for the enhancement and detection of a bright (dark) object in a dark (bright) background, although they may also be employed to detect object edges by using the property of zero-crossing. Assume that a 3-D image is denoted by $f(x, y, z)$; its 6 second derivatives to be used are generally represented by $f_{xx}$, $f_{yy}$, $f_{zz}$, $f_{xy}$, $f_{xz}$, and $f_{yz}$. Three additional second derivatives ($f_{yx}$, $f_{zx}$, and $f_{zy}$) are not used because they are equal to $f_{xy}$, $f_{xz}$, and $f_{yz}$, respectively. For any point on the center dot, center line, or center plane of the three shapes denoted by Eq. (1), the mixed second derivatives $f_{xy}$, $f_{xz}$, and $f_{yz}$ have a value of zero. As will be described later, if the mixed second derivatives have values other than zero, the coordinate system is rotated to make them vanish. Therefore, the filters depend only on the three second derivatives ($f_{xx}$, $f_{yy}$, and $f_{zz}$) which are denoted by $\lambda_1$, $\lambda_2$ and $\lambda_3$, respectively, because they are the three eigenvalues of the Hessian matrix that satisfy $|\lambda_1| \geq |\lambda_2| \geq |\lambda_3|$.

The following conditions indicate that the three second derivatives $\lambda_1$, $\lambda_2$ and $\lambda_3$ must satisfy for a dot, a line, and a plane when $\sigma$ is small:

$$\text{dot: } \lambda_1 = \lambda_2 = \lambda_3 = -1/\sigma^2 << 0, \quad (1)$$

$$\text{line: } \lambda_1 = \lambda_2 = -1/\sigma^2 << 0, \lambda_3 = 0, \quad (2)$$

$$\text{plane: } \lambda_1 = -1/\sigma^2 << 0, \lambda_2 = \lambda_3 = 0. \quad (3)$$

The present invention lets $e_2 = |\lambda_2|/|\lambda_1|$ and $e_3 = |\lambda_3|/|\lambda_1|$, and temporarily ignores the significance of the sign of the three second derivatives. The above conditions may then be rewritten as $$\text{dot: } e_2 = 1, e_3 = 1, \quad (1)$$

$$\text{line: } e_2 = 1, e_3 = 0, \quad (2)$$

$$\text{plane: } e_2 = 0, e_3 = 0. \quad (3)$$

Since $0 \leq e_3 \leq e_2 \leq 1$, the above conditions may be further simplified as $$\text{dot: } e_3 = 1, \quad (1)$$

$$\text{line: } e_2 = 1, e_3 = 0, \quad (2)$$

$$\text{plane: } e_2 = 0. \quad (3)$$

As described above, for any embodiment to achieve a good sensitivity and a good specificity, the response of an enhancement filter preferably includes the following two components: magnitude and likelihood.

Magnitude is given by a function $g(\lambda_1, \lambda_2, \lambda_3)$ of the three second derivatives. The magnitude indicates whether a bright (dark) object exists in a dark (bright) background, but generally does not provide information concerning the shape of the object. Therefore, this component alone lacks adequate discriminatory power to distinguish different types of objects. However, it does contribute to the construction of a good enhancement filter for a specific shape (dot, line, or plane), as long as it is not in favor of the other two shapes. For example, $g(\lambda_1, \lambda_2, \lambda_3) = |\lambda_1| + |\lambda_2| + |\lambda_3|$ is not a good magnitude function for a line or a plane, because a dot has a larger value for this function than does a line or a plane, which implies that this function is generally in favor of a dot. Although, this function is a reasonably good magnitude function for a dot enhancement filter, a line and even a plane may also provide a large value for this function.

In Shimizu (reference 12), an enhancement filter for a nodule is used which is conceptually similar to using a magnitude function $g(\lambda_1, \lambda_2, \lambda_3) = |\lambda_3|$, where a large number of orientations were used for the calculation of the second derivatives. This is a good choice for the magnitude function of a nodule enhancement filter because a line or a plane has a very weak response from this function. However, this function alone as the output of a nodule enhancement filter is not able to distinguish a circle from a largely elongated ellipse. Therefore, the present invention also employs a likelihood function to achieve distinction among different shapes.

In one embodiment, likelihood is also given by a function $k(\lambda_1, \lambda_2, \lambda_3)$ of the three second derivatives. Other likelihood functions may be used in other embodiments. When likelihood is given by a function $k(\lambda_1, \lambda_2, \lambda_3)$, this function indicates the probability that a voxel belongs to a specific shape, and its output is a value between 0 and 1. For a dot enhancement filter, this function preferably has a value of 1 for a dot and has a value of 0 for a line and a plane.

For a dot, its unique condition that a line and a plane do not satisfy is $e_3 = 1$. Therefore, the likelihood of a dot is defined as $$k_{dot}(\lambda_1, \lambda_2, \lambda_3) = e_3 = |\lambda_3|/|\lambda_1|.$$

Similarly, likelihood functions for a line and a plane are defined according to their unique requirements listed above, i.e., $$k_{line}(\lambda_1, \lambda_2, \lambda_3) = e_2 - e_3 = (|\lambda_2| - |\lambda_3|)/|\lambda_1|,$$

$$k_{plane}(\lambda_1, \lambda_2, \lambda_3) = 1 - e_2 = (|\lambda_1| - |\lambda_2|)/|\lambda_1|.$$

Each of the likelihood functions provides an output value of 1 for a specific shape, and an output value of 0 for the other two shapes. Therefore, each of the functions has a good specificity for a specific shape.

As described previously, $|\lambda_3|$ is a good choice for the magnitude function for a dot enhancement filter, and is therefore employed in an embodiment of the present invention, i.e., $$g_{dot}(\lambda_1, \lambda_2, \lambda_3) = |\lambda_3|.$$

The magnitude functions for a line and a plane may be defined similarly as $$g_{line}(\lambda_1, \lambda_2, \lambda_3) = |\lambda_2|,$$

$$g_{plane}(\lambda_1, \lambda_2, \lambda_3) = |\lambda_1|.$$

None of the magnitude functions for a specific shape outputs a response in favor of the other two shapes. Therefore, in addition to the likelihood functions, the magnitude functions also make contributions to the good specificity for the three enhancement filters.

The enhancement filters for dot, line, and plane are defined by the product of the magnitude function and likelihood function, i.e., $$d_{dot}(\lambda_1,\lambda_2,\lambda_3) = g_{dot}(\lambda_1,\lambda_2,\lambda_3) k_{dot}(\lambda_1,\lambda_2,\lambda_3) = |\lambda_3|^2/|\lambda_1|,$$

$$d_{line}(\lambda_1,\lambda_2,\lambda_3) = g_{line}(\lambda_1,\lambda_2,\lambda_3) k_{line}(\lambda_1,\lambda_2,\lambda_3) = |\lambda_2|(|\lambda_2|-|\lambda_3|)/|\lambda_1|,$$

$$d_{plane}(\lambda_1,\lambda_2,\lambda_3) = g_{plane}(\lambda_1,\lambda_2,\lambda_3) k_{plane}(\lambda_1,\lambda_2,\lambda_3) = |\lambda_1|-|\lambda_2|. \quad (2)$$

To enhance bright objects in a dark background, the sign of the second derivatives is optionally taken into account. For a specific shape, if the following condition is not satisfied, the output of its corresponding enhancement filter in Eq. (2) is approximately zero, i.e., dot: $\lambda_1=0$, $\lambda_2<0$, $\lambda_3<0$, line: $\lambda_1<0$, $\lambda_2<0$, plane: $\lambda_1<0$. (3)

The final enhancement filters for dot, line, and plane are a combination of Eqs. (2) and (3).

It is not necessary to consider the effect of the three mixed second derivatives ($f_{xy}$, $f_{xz}$, and $f_{yz}$) because they have a value of zero for the three idealized shapes shown in FIG. 1. However, this condition is not always true. For example, if a line does not lie on any of the three axes in 3-D space, the three mixed second derivatives ($f_{xy}$, $f_{xz}$, and $f_{yz}$) will not be equal to zero, which will complicate the construction of the enhancement filters. A simple method for overcoming this problem is to rotate the coordinate system so that the line lies on one of the three axes, and the mixed second derivatives vanish. Similarly, the coordinate system is rotated to align a plane with one of the three planes spanned by the x-y, x-z, and y-z axes. A challenge is determining the three rotation angles for the three axes used to make the mixed second derivatives vanish.

In fact, explicit rotation of the coordinate system is not necessary. It is acceptable to eliminate the three mixed second derivatives, which may be achieved by use of the more efficient mathematical method of Press (reference 22). Thus, a Hessian matrix of the original 3 D image f(x,y,z) is constructed at a voxel (x,y,z), whose components are the second derivatives of f(x,y,z), i.e., $$H = \begin{vmatrix} f_{xx} & f_{xy} & f_{xz} \\ f_{yx} & f_{yy} & f_{yz} \\ f_{zx} & f_{zy} & f_{zz} \end{vmatrix}, \quad (4)$$

where $f_{xy}=f_{yx}$, $f_{xz}=f_{zx}$, and $f_{yz}=f_{zy}$.

Because H is a real, symmetrical matrix, a 3×3 real matrix Z is used to transform the Hessian matrix H into a diagonal matrix R, $$R = \begin{vmatrix} \lambda_1 & 0 & 0 \\ 0 & \lambda_2 & 0 \\ 0 & 0 & \lambda_3 \end{vmatrix} = Z^T H Z = Z^T \begin{vmatrix} f_{xx} & f_{xy} & f_{xz} \\ f_{yx} & f_{yy} & f_{yz} \\ f_{zx} & f_{zy} & f_{zz} \end{vmatrix} Z, \quad (5)$$

where $Z^T$ is the transpose of the matrix Z.

It turns out that the three column vectors of the matrix Z are the three eigenvectors of the Hessian matrix H, and the three diagonal elements $\lambda_1$, $\lambda_2$, and $\lambda_3$ of the matrix R are the three eigenvalues of H. Also, the three eigenvalues are sorted in such an order that $|\lambda_1| \geq |\lambda_2| \geq |\lambda_3|$ is satisfied.

Because the six off-diagonal elements have been eliminated in the matrix R, the three eigenvalues $\lambda_1$, $\lambda_2$, and $\lambda_3$ are used to construct the enhancement filters, as described previously. This implies that the computation of the eigenvalues is equivalent to the diagonalization of the Hessian matrix, and is further equivalent to the rotation of the coordinate system. In the new coordinate system, the three axes are the three eigenvectors of the Hessian matrix. The determination of the three eigenvalues of the Hessian matrix is performed for every voxel.

In another embodiment, rather than employing the Hessian matrix, a radial method of calculating the three second derivatives may be used as follows:

1) For a voxel in question, derive many evenly distributed straight lines (radial lines) passing through the voxel in 3-D image space. The resulting 1-D array of voxels on each line constitutes a 1-D signal.

2) Calculate second derivative for each and every 1-D signal derived above.

3) Determine a second derivative that has the maximum absolute value among all second derivatives calculated above. This second derivative (approximately) corresponds to the first eigenvalue ($\lambda_1$) of Hessian matrix. The radial line corresponding to this second derivative (approximately) corresponds to the first eigenvector of Hessian matrix.

4) Determine a second derivative that has the maximum absolute value among all second derivatives whose radial lines are perpendicular to the straight line determined in step 3). This second derivative (approximately) corresponds to the second eigenvalue ($\lambda_2$) of Hessian matrix. The radial line corresponding to this second derivative (approximately) corresponds to the second eigenvector of Hessian matrix.

5) Determine a (unique) second derivative whose radial line are perpendicular to the two straight lines determined in steps 3) and 4). This second derivative (approximately) corresponds to the third eigenvalue ($\lambda_3$) of Hessian matrix. The radial line corresponding to this second derivative approximately corresponds to the third eigenvector of Hessian matrix.

The enhancement filters for dot, line, and plane described above do not take into account the effect of noise and the scale (thickness) of the objects. Thus, application of these enhancement filters, alone, to a real image may not always produce a good result. This is because the second derivatives are inherently sensitive to image noise, and because they lack an ability to provide large responses for objects with a variety of scales, such as nodules with different sizes.

A method to resolve this problem is to convolve a 3-D Gaussian function with the original 3-D image before the second derivatives are calculated as per Press and Koenderink (reference 22 and 23, respectively). In effect, not only does the convolution with a Gaussian function smooth out image noise, it also serves as a matched filter to preserve an object with an appropriate scale. If a priori knowledge regarding the scale of an object to be enhanced (object scale) is known, it is possible to know what scale to choose for the Gaussian smoothing filter (smoothing scale). For simplicity and without loss of generality, the scale of a Gaussian smoothing filter is determined in a 1-D space. The smoothing scale thus obtained is also applicable to 2-D and 3-D images.

While a Gaussian smoothing function is used here, other embodiments using alternative smoothing functions, including averaging over a region of pixels, a modified Bessel function of integer order, and others, are possible.

An object in a 1-D space may be denoted by a 1-D Gaussian function with a scale parameter $\sigma_0$. It is then reasonable to assume that this object has a radius of $2\sigma_o$, because such an object accounts for more than 95% of the area of the Gaussian function. That is to say, for an object of radius w, one can approximate the object by use of a Gaussian function with a scale parameter w/2. Before actually calculating the second derivatives of the object in a 3-D image for the construction of an enhancement filter, it is preferable to first convolve the object with a Gaussian smoothing function.

These two steps, Gaussian smoothing and calculation of second derivatives, may be combined into a single step, namely, convolution between the object and the second derivative of a Gaussian smoothing function. In order to produce at the object center a maximum response value from the convolution between an object of scale $\sigma_o$ and the second derivative of a Gaussian function of scale $\sigma_s$, the two scales $\sigma_0$ and $\sigma_s$ must be the same as shown in Nakamura (reference 25). Therefore, for an object of radius w, the "optimal" scale of the Gaussian smoothing filter is w/2.

If the radii of the objects to be enhanced are assumed to be in a range of $[w_0, w_1]$, in order to enhance all objects in this range of scales, a Gaussian filter in the scale range of $[w_0/2, w_1/2]$ may optionally be used to smooth a 3-D image before applying filters of the present invention to enhance dot, line, and plane objects. These two steps may be repeated N times with increasing smoothing scales to provide N enhanced images. The N discrete scales in the range of $[w_0/2, w_1/2]$ may be calculated as follows:

$$\sigma_1 = w_0/2,\ \sigma_2 = r\sigma_1,\ \sigma_3 = r^2 \sigma_1, \ldots, \sigma_N = r^{N-1}\sigma_1 = w_1/2, \quad (6)$$

where $r = (w_1/w_0)^{1/(N-1)}$

The relationship between the scales is exponential as shown in Koenderink (reference 23). Each of the enhancement filters enhances objects with a specific scale, and the final output of the multi-scale enhancement filters at a location is the maximum value from the N individual filters. However, the magnitude of the convolution with the second derivative of a Gaussian function is inversely proportional to the square of its scale as shown in Lindeberg (reference 25). Therefore, in order to make the filter response comparable for different smoothing scales, the output of the convolution with the second derivative of a Gaussian function is multiplied by a factor of $\sigma_s^2$. FIG. 12 is flow chart of an algorithm of the multi-scale enhancement filters for dot, line, and plane according to one embodiment of the present invention, where steps 1–10 are noted as S1–S10, respectively.

The range of radius $[w_0, w_1]$ of the objects to be enhanced is determined along with a corresponding number of scales N, and the individual scales by use of Eq. (6) (S1). For each scale $\sigma_s$, steps 3–9 are performed (S2). The original 3-D image is smoothed with a 3-D Gaussian function of scale $\sigma_s$ (S3). For each voxel, steps 5–7 are performed (S4). The Hessian matrix of Eq. (4), and its three eigenvalues $\lambda_1$, $\lambda_2$, and $\lambda_3$ as shown in Eq. (5) are computed (S5). The outputs of the dot, a line, and plane enhancement filters are computed by use of Eqs. (2) and (3) (S6). Steps S5–S6 are repeated for all other voxels, otherwise proceed to step 8 (S7). Each voxel is multiplied by $\sigma_s^2$ in the output image from the enhancement filter at scale $\sigma_s$ (S8). Steps S3–S8 are repeated for all scales, otherwise the process proceeds to step 10 (S9). For each voxel, the final output as the maximum value is determined from the output of all individual filters of N scales (S10).

In step 5 of the above algorithm, it is preferable to calculate the Hessian matrix, whose elements are the second derivatives determined at a voxel in a 3-D image. In order to determine those second derivatives, the following central difference is employed to approximate the first derivative $f_x$, i.e., $$f_x(x,y,z) = (f(x+1,y,z) - f(x-1,y,z))/2.$$

The other two first derivatives, $f_y$ and $f_z$, may be defined similarly.

By applying the first derivatives twice to the 3-D image, it is possible to then obtain the second derivatives, i.e., $$f_{xx}(x,y,z) = (f(x+2,y,z) - 2f(x,y,z) + f(x-2,y,z))/4,$$

$$f_{xy}(x,y,z) = (f(x+1,y+1,z) - f(x+1,y-1,z) - f(x-1,y+1,z) + f(x-1,y-1,z))/4.$$

The other second derivatives may be determined in a similar way.

Figure 2:
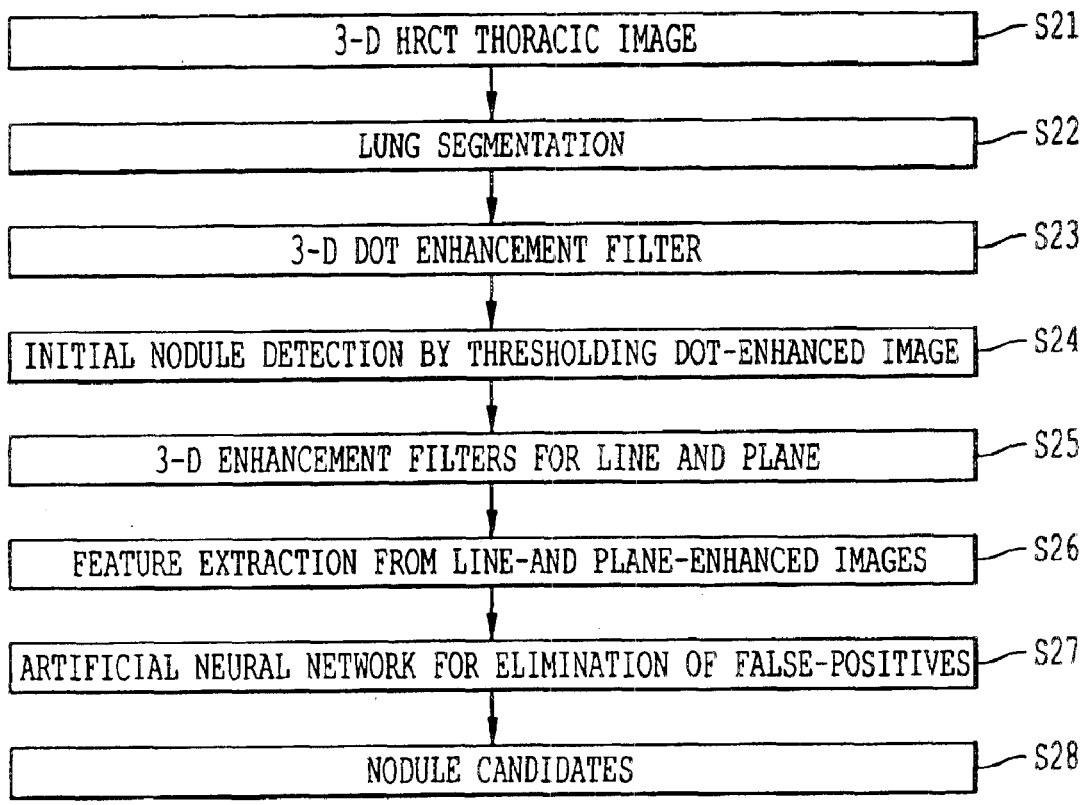
FIG. 2 is an illustration of the overall scheme for nodule detection in 3-D HRCT images by use of the three enhancement filters for a dot, line, and plane.

FIG. 2 shows the overall method for nodule detection in 3-D HRCT images by use of the three enhancement filters. Preferably, lungs are first segmented in either 3-D or, alternatively, in each 2-D section by use of a thresholding technique (S21). However, embodiments without segmentation are also possible. A pixel with a CT value between −400 HU and −1000 HU is considered as being located inside the lung regions, and is thus assigned a value of 1; otherwise, the pixel is considered as belonging to the background, and is thus assigned a value of 0. However, as described in Armato (reference 15), if a nodule is connected to the pleura, the nodule would be excluded from the lung regions because the gray-scale values for the pixels inside the nodule would be out of the range between −400 HU and −1000 HU. A rolling ball algorithm along the outlines of lung regions is used to compensate for this type of segmentation error.

The 2-D lung regions in all sections constitute a 3-D binary volume, to which at least one and preferably each of the three multi scale enhancement filters are applied in parallel, beginning with the 3-D dot enhancement filter (S23).

Either before or after applying the line and plane filters, optionally a region of interest (ROI) including candidate nodules is identified (S24). This may include computer-based thresholding that includes a computer-assisted comparison of values derived from the first filter to a predetermined threshold value. Alternatively, the thresholding technique may be a more complex method for selecting the initial nodule candidates. In lieu of thresholding, other ROI and candidate nodule identification techniques may be used such as those identified in co-pending application Ser. No. 09/121,719 and application Ser. No. 09/830,574 as well as those identified in U.S. Pat. No. 6,088,473, U.S. Pat. No. 5,881,124, and U.S. Pat. No. 4,907,156. Also, manual identification of regions of interest is possible. With any of these techniques, the region of interest may be the entire image or may be a subset of the image. For example, ROI's may be defined as kernels centered on each pixel of filtered image data. Each kernel may be 3×3 pixel, or larger, and each kernel may be used to extract features from the filtered image data for subsequent application to a classifier as described hereafter.

Whether or not a region of interest and/or nodule candidates are identified from the nodule enhanced (dot-filtered) images, the original image is also filtered with at least one of the 3-D line and plane enhancement filters (S25). Predetermined image features (e.g., size, contrast, shape, regularity, circularity, linearity, smoothness, compactness, etc.) and their corresponding statistical measures (e.g., mean and standard deviation) for the voxels inside each initial candidate are then extracted from the data-enhanced images the line-enhanced images and the plane-enhanced images, respectively, preferably from one or more ROI's determined as above described, and are used as analysis features (S26).

These features include intensity measures (pixel values) for the object being evaluated. The features are then input into at least one classifier (S28) where nodule candidates are selected (S28) with a reduced rate of false-positives. The classifier is preferably an artificial neural network (ANN) but may also be a Bayesian network, a Linear Discriminant Analysis (LDA); a K nearest neighbor classifier (K-NN); a support vector machine; or another image classifier. The classifier may be a single classifier where the classifier inputs are the outputs of one or more filters. Alternatively, the classifier may be plural classifiers connected in parallel and/or in series.

Preferably, the outputs of the line and plane filter are each input to a single classifier. Optionally, the mean and standard deviation for the voxels inside each initial candidate are also determined from the dot-enhanced images and are also used as features in the ANN (not shown).

Assuming a range of diameters for nodules to be between 4 mm and 24 mm, which correspond to smoothing scales of 1 mm and 6 mm, respectively, for the multi-scale dot enhancement filter, the present invention may employ single or multiple scales (e.g., 5 scales of 1, 1.6, 2.4, 3.8, and 6 mm) according to Eq. (6)). It is noted, for some medical conditions, nodules larger than 24 mm and smaller than 30 mm may also provide strong responses to the filter intended for the enhancement of nodules of 24 mm. Thus, different scale sizes and numbers may be used depending on a priori information or assumptions.

In other embodiments, the first filter is either the line-enhancement filter (e.g., to identify and extract blood vessel or other linear features) or the plane-enhancement filter (e.g., to identify and extract organ wall or other planar features). In these embodiments, images that meet the threshold/selection criteria are then filtered with the remaining two filters. Statistical features from one or more filtered data sets are then extracted and provided to the classsifier.

Alternative embodiments are also possible with two or more dot, line, and plane enhancement filtes arranged in series. Also, combinations of serial and parallel filters are possible. Also, embodiments are possible where the corresponding thresholding to identify ROIs is performed on either line-filtered or plane-filtered data.

Figure 3C:
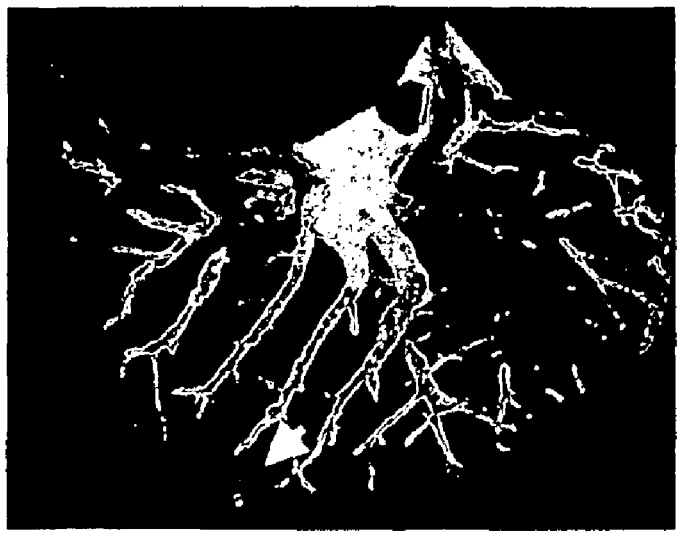
FIGS. 3a–3c are illustrations of a maximum intensity projection of three original HRCT images with nodules identified by arrows.
Figure 3B:
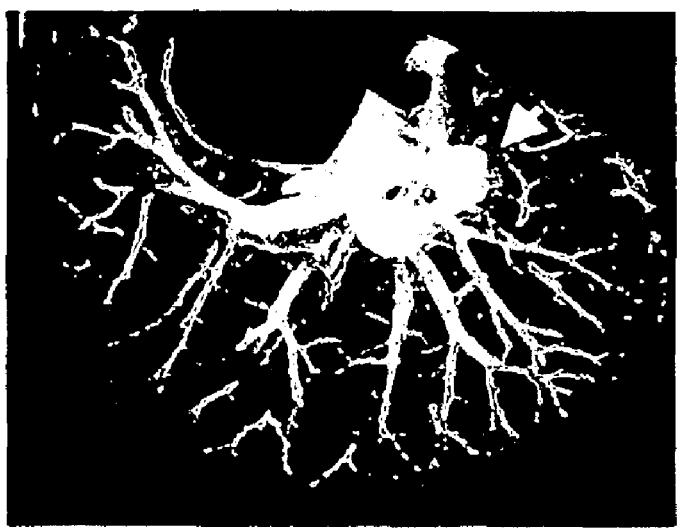
Figure 3A:
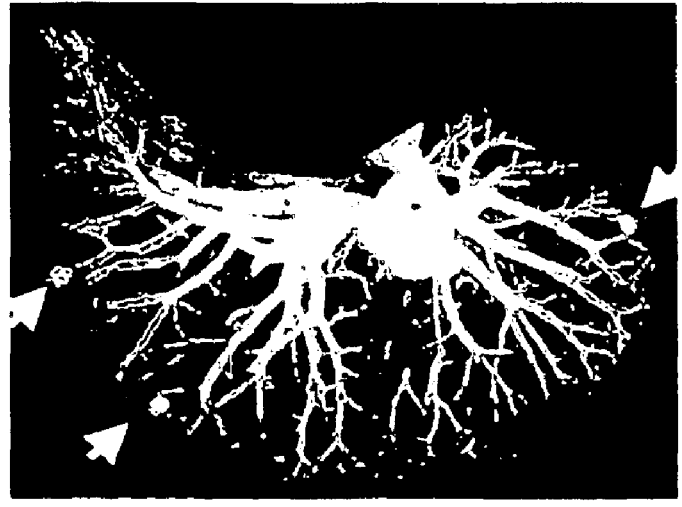

FIG. 3-$a$ shows the maximum intensity projection (MIP) of three 3-D HRCT images, in which the nodules are identified by arrows. The nodule in FIG. 3-$b$ is attached to vessels and the nodule in FIG. 3-$c$ is attached to the chest wall. Both are of low contrast. These are examples of nodules that are difficult to segment by applying a simple thresholding technique to basic HRCT images.

Figure 4C:
Figure 4C:
Figure 4C:
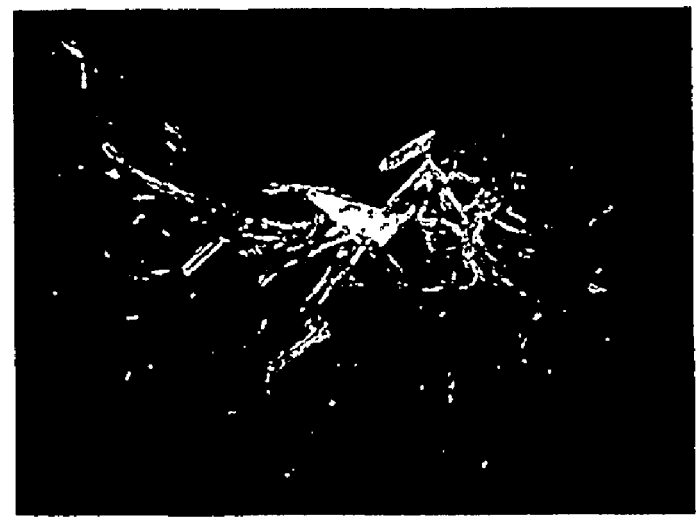

FIG. 4-$a$ shows the MIP of the three 3-D images (FIG. 3-$a$, $b$, and $c$, respectively) enhanced by use of the multi-scale nodule enhancement filter. FIGS. 4-$b$ and 4-$c$ show the images enhanced by use of the line and plane enhancement filters, respectively. Although the size of the nodules are reduced slightly in the nodule-enhanced images, it is apparent that the spherical structures such as nodules were enhanced significantly (for example, as shown in FIG. 3-$c$), whereas other structures such as vessels and airway walls are suppressed remarkably (for example, the vessels attached to the nodule in FIG. 3-$b$). This image processing significantly simplifies the task of initial nodule detection.

The nodule-enhanced images are then thresholded with a fixed value of 20; namely, a voxel with a value greater than 20 is considered to be an object voxel and is assigned a value of 1. A voxel not satisfying this condition is considered to be a background voxel and is assigned a value of 0. A 3-D connected-component labeling technique is then employed to identify all isolated objects. Each of the objects with a volume smaller than 15 mm (approximately the volume of a sphere with a diameter of 3 mm) is considered to be a non-nodule, and is eliminated.

Because the majority of false-positives in nodule detection are caused by vessels and airway walls, the enhancement filters for a line and a plane are used. Here a single-scale scheme is used in which the smoothing scales were empirically set to 1 mm and 0.25 mm, respectively. FIGS. 4-$b$ and 4-$c$ show the maximum intensity projection of the enhanced images by applying line and plane enhancement filters, respectively, to the original images in FIG. 3. These figures show the nodules have been suppressed significantly in the line- and plane-enhanced images, thus highlighting the usefulness of the present invention in the reduction of false-positives caused by vessels and airway walls.

In a study employing the method of the present invention as above described, 88 out of 90 nodules (97.8%) were detected with a total of 915 false-positives in the 85 HRCT cases. Therefore, the average numbers of false-positives per case and per section arc 10.8 and 0.4, respectively. This represents a superior initial detection result compared to that in other nodule detection schemes (references 9–18), in which tens of false-positives are generally selected as nodule candidates in each 2-D image (section) in the initial nodule detection stage.

Figure 5:
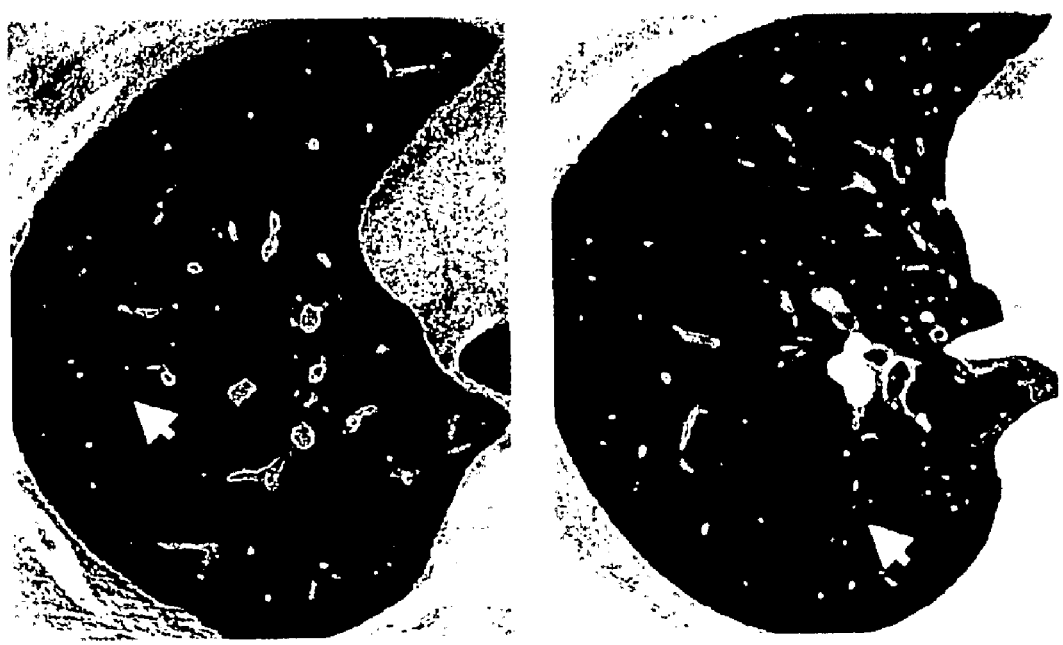
FIG. 5 is an illustration of the 2-D sections of two nodules not detected by the present invention.
Figure 6:
FIG. 6 is an illustration of the 2-D sections of three nodules with GGO opacities successfully detected by the present invention.

Also, the two nodules that the present invention failed to detect were benign. A 2-D section image for each benign nodule is shown in FIG. 5. The section shown for each nodule is the one in which the nodule manifests itself most conspicuously. It is apparent that the two nodules are of pure GGO opacities and of very low contrast, and thus are very difficult to detect. In fact, many nodules with GGO opacities were successfully selected by initial detection technique of the present invention. FIG. 6 shows 2-D sections for three of the detected nodules with pure GGO opacities. More details about this testing are found below.

FIGS. 7$a$–7$b$ show an original section and a corresponding enhanced section, respectively for each of the cases in FIGS. 3$a$–3$c$. It is apparent that, although the edges of nodules and vessels may remain in the plane-enhanced images, the airway wall was enhanced most significantly.

For each of the nodule candidates, two features are then extracted (the mean and standard deviation) from the line- and plane-enhanced images. The mean and standard deviation are determined based on the voxels inside the nodule candidates that are segmented from the dot-enhanced images, as described above.

Figure 8:
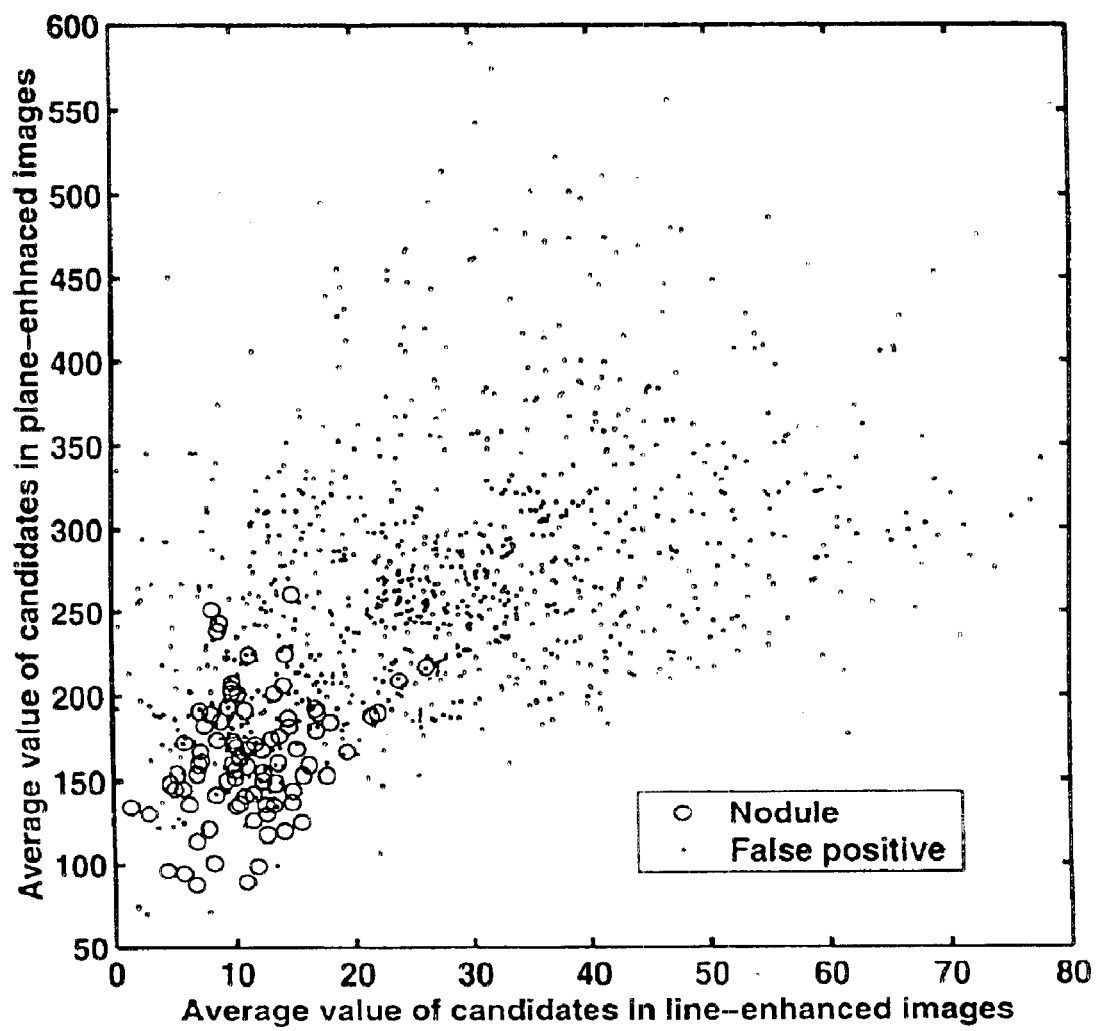
FIG. 8 is an illustration of the relationship between mean voxel values determined from the line- and plane-enhanced images for 88 nodules and 915 false-positives.

FIG. 8 shows the relationship between the two features of the voxel mean determined from the line- and plane-enhanced images for all nodule candidates (88 true nodules and 915 false-positives). It is apparent that the nodules generally have smaller mean values from the output of the enhancement filters for line and plane, whereas false-positives have larger mean values.

Figure 9:
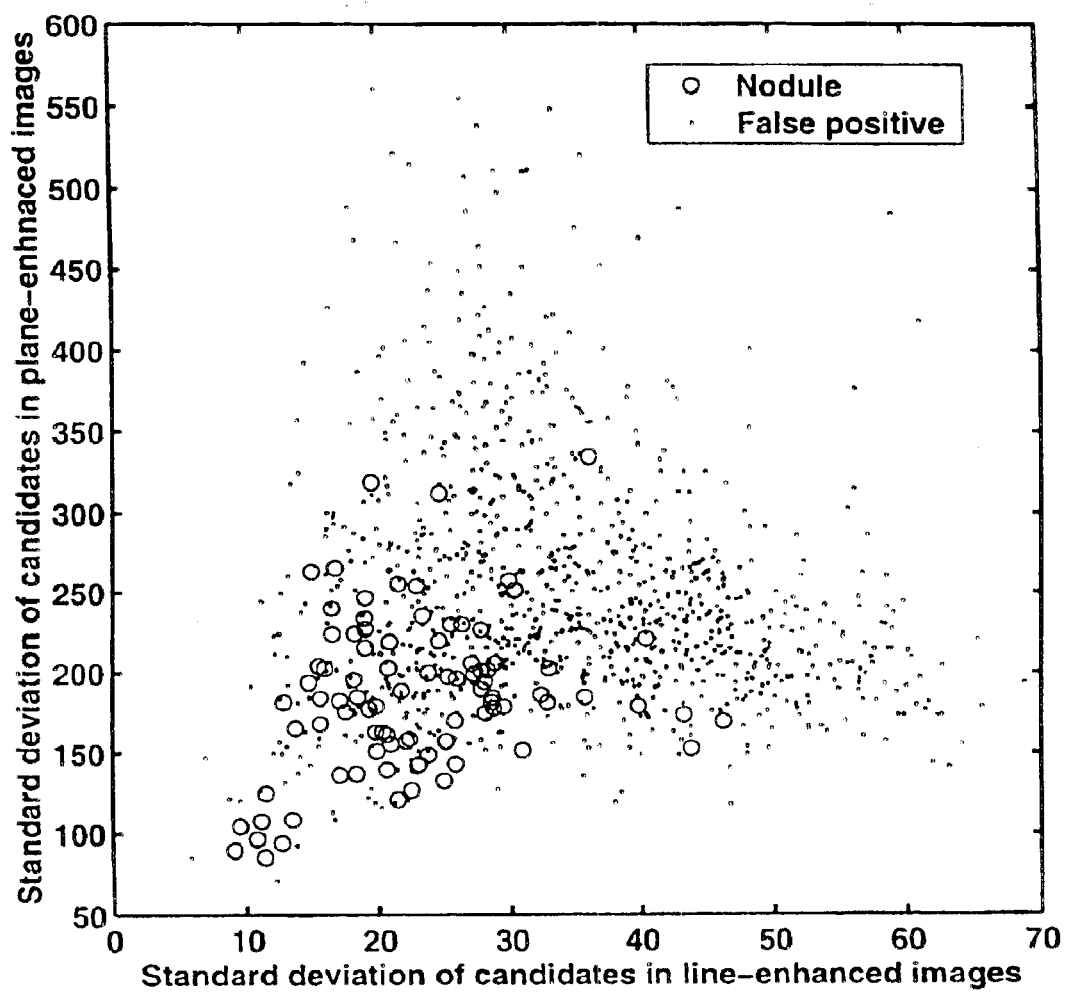
FIG. 9 is an illustration of the relationship between standard deviation values determined from the line- and plane-enhanced images for 88 nodules and 915 false-positives.

FIG. 9 shows the relationship between the two features of standard deviation determined from the line- and plane-enhanced images for all nodule candidates. Again, the nodules generally have smaller standard deviation values from the output of the enhancement filters for line and plane, whereas false-positives have larger standard deviation values. In order to verify that these features are useful for the reduction of false-positives, an artificial neural network (ANN) is used to distinguish nodules from false-positives.

The ANN is a three-layer ANN with an input layer, an output layer, and a hidden layer (references 26 and 27). Four input units corresponding to the four features of the voxel mean and standard deviation are used. These features are determined from the line- and plane-enhanced images. The single output unit represents the likelihood measure of a true nodule. An output of 0 or 1 indicates a 0% or 100% confidence, respectively, that a nodule candidate is a true nodule. The number of units in the hidden layer is empirically set to 4. In order to minimize the bias in the procedure of evaluation, a round-robin (leave-one-out) method is used for verifying the effectiveness of the four features in the reduction of false-positives. A nodule candidate may be excluded temporarily from the nodule candidates in training the ANN.

After the ANN is trained, the features of any nodule candidate excluded for training may be entered as inputs to the ANN for determination of a likelihood measure. This process is repeated for each of the nodule candidates, until the likelihood measures for all nodule candidates are calculated. The output value of the ANN is then thresholded with a fixed value. A nodule candidate with an output value greater than the threshold is considered to be a nodule and is retained. The other nodule candidates are considered to be false-positives and are eliminated.

In another embodiment, images resulting from the various geometric filters are displayed in a medical image display device. In another embodiment, images resulting from the various geometric filters are stored, transferred via email, and/or processed with other image processing equipment.

In the above-mentioned testing, using the ANN with a round-robin testing method, the CAD scheme of the present invention detected 84 out of 90 nodules (93.3%), with an average number of false-positives of 2.4 per case. In this study all 41 malignant nodules (cancers) were detected at this level of false-positive rate.

Using a dot filter for enhancement and initial detection of nodules in 3-D CT images, 97.8% (88 out of 90) of the nodules employed in a test were initially detected, with 10.8 false-positives per case. These results are superior to those obtained with the initial detection methods in current CAD schemes for lung nodule detection (reference 9–18). In order to verify the effectiveness of the line and plane enhancement filters in distinguishing nodules from vessels and airway walls, the output of the other two filters was used to further reduce false-positives. By using the output of all the three filters, the CAD scheme of the present invention achieved a sensitivity of 93.3% and 2.4 false-positives per case demonstrating that these three filters are very effective in the distinction between nodules and other anatomic structures. Details about these tests follow.

By way of background, from May 1996 to March 1999, 17,892 examinations on 7,847 individuals (with an average age of 61 years) were performed as part of an annual low-dose helical CT (LDCT) screening program for early detection of lung cancers in Nagano, Japan (references 4–7). There were 7,847 initial examinations performed in the first year, and 5,025 and 5,020 repeat examinations performed in the following two years. Six hundred and five patients were found to have 747 suspicious pulmonary nodules (<30 mm) in LDCT, among whom 271 patients with confirmed nodules were further examined by use of a high-resolution CT scanner (HRCT). However, only 85 of these historical HRCT scans were used in testing the present invention because the remaining scans did not have sufficient numbers of contiguous sections (less than 16). Among the 85 patients, forty were confirmed to have 41 primary lung cancers by surgery or biopsy, and forty-five were confirmed to have 49 benign nodules by HRCT reading, two year follow-up examinations, or surgery. Thus, the database employed in testing the present invention consisted of the 85 HRCT scans with 90 confirmed nodules.

Furthermore, the HRCT scanner used with these historical cases scanned the patients' chest with 1 mm collimation (section thickness) and a 0.5 mm reconstruction interval. Each section was saved in the DICOM image format, with a matrix size of 512×512, a pixel size of 0.391 mm, and 4096 (12 bits) gray levels in Hounsfield units (HUs). Each of the 3-D images was re-scaled by interpolation so that the voxel became isotropic, and had a size of 0.5 mm in each of the three dimensions. The nodule size in these historical scans ranged from 4 mm to 30 mm (average, 11 mm). Based on consensus, three radiologists then classified the 90 nodules into three categories, namely, solid nodules, nodules with GGO, and nodules with mixed GGO. There were 44 (48.9%) solid nodules, 13 (14.4%) nodules with GGO, and 33 (36.7%) nodules with mixed GGO in the set of 90 nodules. A nodule with a GGO opacity is generally very difficult to detect because of its low contrast and low CT values.

The 3-D enhancement filters of the present invention can not only be employed as pre-processing filters for the initial detection of specific objects. They may also be used to determine effective nodule features and to improve performance of an existing CAD scheme. The dot filter of the present invention may be used for the enhancement and initial detection of lung nodules in HRCT images. The line filter and plane filter of the present invention may be used for the determination of nodule features and for the elimination of false-positives.

The 3-D enhancement filters of the present invention may also be used in many non-lung cancer diagnostic applications. Examples include polyp detection in 3-D CT colon images and tumor detection in 3-D CT liver images.

The enhancement filters of the present invention may also be simplified and applied for 2-D images enhancement. Simplified 2-D filters may be used for detection of lung nodules in 2-D CT images and chest radiographs. Simplified 2-D filters may also be used for the detection of masses and micro-calcifications in mammograms and ultrasound images.

In a 2-D image space, there are two types of basic shapes (dot and line). Therefore, an alternative embodiment of the present invention adapts the filter construction techniques described above to create enhancement filters for a dot and a line in 2-D images.

For a 2-D image f(x,y), a Hessian matrix is calculated:

$$H = \begin{vmatrix} f_{xx} & f_{xy} \\ f_{yx} & f_{yy} \end{vmatrix},$$

where $f_{xy}=f_{yx}$.

In 2-D image space, the two eigenvalues of the Hessian matrix may be determined by the following equations:

$$\lambda_1 = K + \sqrt{K^2 - H^2},$$

$$\lambda_2 = K - \sqrt{K^2 - H^2},$$

$$K = (f_{xx} + f_{yy})/2,$$

$$H = \sqrt{f_{xx} * f_{yy} - f_{xy} * f_{yx}}.$$

If $|\lambda_1|<|\lambda_2|$, the values of the eigenvalues $\lambda_1$ and $\lambda_2$ are exchanged. Thus, the enhancement filters for dot and line in 2-D images may be denoted by dot: $d_{dot}(\lambda_1,\lambda_2)=|\lambda_2|^2/|\lambda_1|$, if $\lambda_1<0$, $\lambda_2<0$, line: $d_{line}(\lambda_1,\lambda_2)=|\lambda_1|-|\lambda_2|$, if $\lambda_1<0$.

In order to verify that the 2-D enhancement filters have good sensitivity and specificity, two exemplary filters were used in a study to initially detect nodules in a dataset of low-dose computed tomographs (LDCT). From May 1996 to March 1999, seventy-three patients were found with 76 primary lung cancers (<30 mm) in an annual screening program for early detection of lung cancers with LDCT in Nagano, Japan. These cancer patients also included 15 benign nodules; therefore, the dataset consisted of a total of 91 nodules. Each LDCT examination was scanned with 10 mm collimation and a 10 mm reconstruction interval, and included 31 sections. Each section had a matrix size of 512×512, a pixel size of 0.586 mm, and 4096 gray levels. The diameters for the 91 nodules ranged from 5 mm to 30 mm (average 12.5 mm). Because the slice thickness was too large, it is not appropriate to apply the 3-D enhancement filters described previously for the initial detection of nodules. Instead, the 2-D enhancement filters are useful in such a circumstance.

The initial detection of nodules in 2-D images was made in a way similar to that in 3-D images. First, the lungs were segmented in each of the sections by use of a thresholding technique. Then the 2-D filters for dot and line were employed to enhance the nodules and vessels, respectively.

Figure 10C:
Figure 10C:
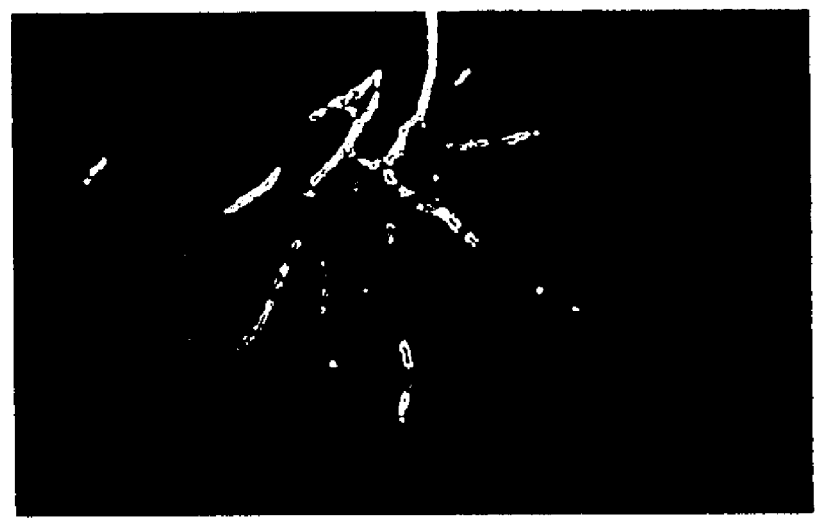
Figure 10C:
Figure 11:
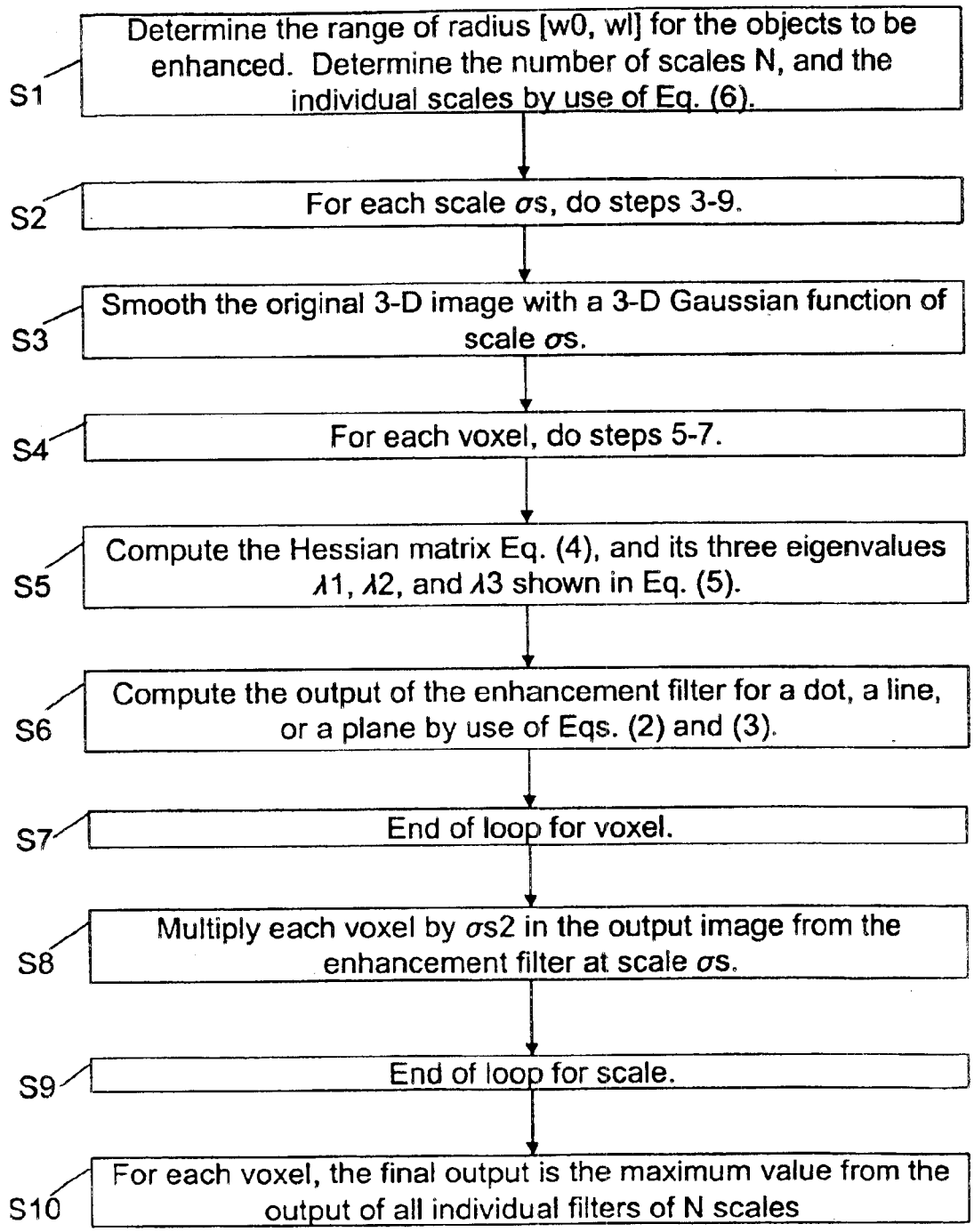
FIG. 11 is a flow chart of an algorithm for multi-scale enhancement filters according to an embodiment of the present invention.

FIG. 10(a) shows three original sections in which each nodule is indicated by an arrow, FIG. 10(b) the 2-D dot-enhanced images, and FIG. 10(c) the 2-D line-enhanced images. It is apparent that the vessels have a higher probability to be enhanced by a dot enhancement filter in 2-D images than do the vessels in 3-D images, because some vessels may appear as circular (dot like) objects in 2-D images. It is noted that most of the bifurcations on vessels are enhanced by the 2-D dot enhancement filter. As a result, the number of false-positives per section is generally greater when the 2-D dot enhancement filter is applied to individual 2-D sections than when the 3-D dot enhancement filter is directly applied to 3-D images.

A fixed threshold value was then employed to segment nodule candidates from background. A connected-component labeling technique was employed to eliminate regions of small area. With this technique, 85 (93.4%) out of 91 nodules were initially detected, with an average false-positive rate of 4.2 per section. The result is significantly superior to that of the template-matching technique described in Lee (reference 14) in which 71 (78%) out of 91 nodules were initially detected with an average false-positive rate of 9.3 per section.

Based on the results of this study, the 2-D enhancement filters of the present invention proved useful for nodule detection in 2-D CT images. The 2-D enhancement filters may also be applied to a computerized scheme for nodule detection in chest radiographs.

The invention may be applied to fields other than medical imaging, in which a target pattern must be distinguished from other patterns in image(s). The techniques described herein may be used to distinguish target objects/areas from other objects/areas by using pattern (feature) differences. Classifiers trained as described above, can be adapted to detect target objects/areas that humans might intuitively recognize at a glance. For example, in addition to the medical imaging, the invention may be applied to:

Detection and/or enhancement of vehicles, white line lane markers, traffic signals, pedestrians, and other obstacles in road images, Detection and/or enhancement of eyes, mouths, and noses in facial images, Detection and/or enhancement of fingerprints in "dust" images, Detection and/or enhancement of faulty wiring in semiconductor integrated circuit pattern images, Detection and/or enhancement of mechanical parts in robotic eye images, Detection and/or enhancement of guns, knives, box cutters, or other weapons or prohibited items in X-ray images of baggage, Detection and/or enhancement of airplane shadows, submarine shadows, schools of fish, and other objects, in radar or sonar images, Detection and/or enhancement of missiles, missile launchers, tanks, personnel carriers, or other potential military targets, in military images, Detection and/or enhancement of weather pattern structures such as rain clouds, thunderstorms, incipient tornadoes or hurricanes, and the like, in satellite and radar images, Detection and/or enhancement of areas of vegetation from satellite or high-altitude aircraft images, Detection and/or enhancement of patterns in woven fabrics, for example, using texture analysis, Detection and/or enhancement of seismic or geologic patterns, for use in oil or mineral prospecting, Detection and/or enhancement of stars, nebulae, galaxies, and other cosmic structures in telescope images, And so forth.

The various applications of detection and/or enhancement, exemplified in the list above, can be achieved by distinguishing one specific target structure from another specific structure once they have been detected. For example, after a fingerprint is detected in a "dust" image, the detected fingerprint can be compared to suspects' fingerprints to verify or disprove the identity of the person leaving the detected fingerprint.

The present invention conveniently may be implemented using a conventional general purpose computer or microprocessor programmed according to the teachings of the present invention, as will be apparent to those skilled in the computer art. Appropriate software may readily be prepared by programmers of ordinary skill based on the teachings of the present disclosure, as will be apparent to those skilled in the software art.

As disclosed in cross-referenced U.S. patent application Ser. No. 09/773,636, a computer 900 may implement the methods of the present invention, wherein the computer housing houses a motherboard which contains a CPU, memory (e.g., DRAM, ROM, EPROM, EEPROM, SRAM, SDRAM, and Flash RAM), and other optional special purpose logic devices (e.g., ASICS) or configurable logic devices (e.g., GAL and reprogrammable FPGA). The computer also includes plural input devices, (e.g., keyboard and mouse), and a display card for controlling a monitor. Additionally, the computer may include a floppy disk drive; other removable media devices (e.g. compact disc, tape, and removable magneto-optical media); and a hard disk or other fixed high density media drives, connected using an appropriate device bus (e.g., a SCSI bus, an Enhanced IDE bus, or an Ultra DMA bus). The computer may also include a compact disc reader, a compact disc reader/writer unit, or a compact disc jukebox, which may be connected to the same device bus or to another device bus.

Examples of computer readable media associated with the present invention include compact discs, hard disks, floppy disks, tape, magneto-optical disks, PROMs (e.g., EPROM, EEPROM, Flash EPROM), DRAM, SRAM, SDRAM, etc.

Stored on any one or on a combination of these computer readable media, the present invention includes software for controlling both the hardware of the computer and for enabling the computer to interact with a human user. Such software may include, but is not limited to, device drivers, operating systems and user applications, such as development tools. Computer program products of the present invention include any computer readable medium which stores computer program instructions (e.g., computer code devices) which when executed by a computer causes the computer to perform the method of the present invention. The computer code devices of the present invention may be any interpretable or executable code mechanism, including but not limited to, scripts, interpreters, dynamic link libraries, Java classes, and complete executable programs. Moreover, parts of the processing of the present invention may be distributed (e.g., between (1) multiple CPUs or (2) at least one CPU and at least one configurable logic device) for better performance, reliability, and/or cost. For example, an outline or image may be selected on a first computer and sent to a second computer for remote diagnosis.

The present invention may also be complemented with addition filtering techniques and tools to account for nodule contrast, degree of irregularity, texture features, etc.

The invention may also be implemented by the preparation of application specific integrated circuits or by interconnecting an appropriate network of conventional component circuits, as will be readily apparent to those skilled in the art.

The source of image data to the present invention may be any appropriate image acquisition device such as an X-ray machine, ultrasound machine, CT apparatus, and MRI apparatus. Further, the acquired data may be digitized if not already in digital form. Alternatively, the source of image data being obtained and processed may be a memory storing data produced by an image acquisition device, and the memory may be local or remote, in which case a data communication network, such as PACS (Picture Archiving Computer System), may be used to access the image data for processing according to the present invention.

Numerous modifications and variations of the present invention are possible in light of the above teachings. It is therefore to be understood that within the scope of the appended claims, the invention may be practiced otherwise than as specifically described herein.

What is claimed is:

1. In a method for evaluating an image including an object, the improvement comprising:

filtering image data derived from the image with a first geometric enhancement filter having magnitude and likelihood filter components to produce first filtered image data in which a first geometric pattern is enhanced, said first geometric pattern comprising one of a dot, line, or plane;

processing the first filtered image data to derive a measure indicative of the presence of said object in said image;

determining a region of interest in the image;

extracting at least one feature from the first filtered image data from within said region of interest; and applying the at least one extracted feature to a classifier configured to output said measure indicative of the presence of said object in said image.

2. The method of claim 1, wherein the step of filtering comprises:

processing the image data using one of a Hessian matrix and a radial derivative algorithm to produce a set of second derivatives;

selecting three second derivatives ($\lambda_1$, $\lambda_2$, $\lambda_3$) in three orthogonal directions from the set of second derivatives; and filtering with a first filter characteristic selected from the group of filter characteristics consisting of $d_{dot}(\lambda_1,\lambda_2,\lambda_3)=g_{dot}(\lambda_1,\lambda_2,\lambda_3)k_{dot}(\lambda_1,\lambda_2,\lambda_3)$, $d_{line}(\lambda_1,\lambda_2,\lambda_3)=g_{line}(\lambda_1,\lambda_2,\lambda_3)k_{line}(\lambda_1,\lambda_2,\lambda_3)$ and $d_{plane}(\lambda_1,\lambda_2,\lambda_3)=g_{plane}(\lambda_1,\lambda_2,\lambda_3)k_{plane}(\lambda_1,\lambda_2,\lambda_3)$.

3. The method of claim 2, wherein the step of filtering comprises:

filtering with a first filter characteristic selected from the group of filter characteristics consisting of $d_{dot}(\lambda_1,\lambda_2,\lambda_3)=|\lambda_3|^2/|\lambda_1|$, $d_{line}(\lambda_1,\lambda_2,\lambda_3)=|\lambda_2|(|\lambda_2|-|\lambda_3|)/|\lambda_1|$ and $d_{plane}(\lambda_1,\lambda_2,\lambda_3)=|\lambda_1|-|\lambda_2|$.

4. The method of claim 1, wherein the image is a medical image.

5. The method of claim 4, wherein the object is a nodule.

6. The method of claim 1, wherein said step of applying the at least one extracted feature to a classifier comprises:

applying the at least one extracted feature to one of an artificial neural network, a Bayesian analyzer, a linear discriminant analyzer, a K-nearest neighbor classifier, and a support vector machine.

7. The method of claim 1, wherein the step of extracting comprises:

extracting a measure of at least one of a) a size, b) a shape, c) a contrast measure, d) a regularity measure, e) a circularity measure, f) a linearity measure, g) a smoothness measure, h) a compactness measure, h) a compactness measure, i) a standard deviation of at least one of features a) through h), and j) a mean of at least one of features a) through h).

8. The method of claim 1, wherein said step of extracting comprises:

extracting said at least one feature from kernels centered on respective pixels.

9. The method of claim 1, wherein said step of determining a region of interest comprises:

thresholding the first filtered image data with predetermined threshold data.

10. The method of claim 2, wherein the step of processing the image data comprises:

smoothing the image data with one of a 2-D and a 3-D Gaussian filter.

11. The method of claim 10, wherein the step of smoothing comprises:

smoothing the image data iteratively with a predetermined number of smoothing scales.

12. The method of claim 2, further comprising:

segmenting the image before filtering to derive said image data.

13. The method of claim 12, wherein the step of segmenting comprises:
processing the segmented image with a rolling ball algorithm.

14. The method of claim 1, further comprising:
filtering the image data with a second geometric enhancement filter having magnitude and likelihood filter components to produce second filtered image data in which a second geometric pattern in the image is enhanced, said second geometric pattern being different from the first geometric pattern.

15. The method of claim 14, wherein the steps of filtering with first and a second geometric enhancement filters comprise:
processing the image data using one of a Hessian matrix and a radial derivative algorithm to produce a set of second derivatives;
selecting three second derivatives ($\lambda_1$, $\lambda_2$, $\lambda_3$) in three orthogonal directions from the set of second derivatives; and
filtering with respective first and second filter characteristics selected from the group consisting of $$d_{dot}(\lambda_1,\lambda_2,\lambda_3)=g_{dot}(\lambda_1,\lambda_2,\lambda_3)k_{dot}(\lambda_1,\lambda_2,\lambda_3),$$

$$d_{line}(\lambda_1,\lambda_2,\lambda_3)=g_{line}(\lambda_1,\lambda_2,\lambda_3)k_{line}(\lambda_1,\lambda_2,\lambda_3) \text{ and}$$

$$d_{plane}(\lambda_1,\lambda_2,\lambda_3)=g_{plane}(\lambda_1,\lambda_2,\lambda_3)k_{plane}(\lambda_1,\lambda_2,\lambda_3).$$

16. The method of claim 15, wherein the steps of filtering with respective first and second filter characteristic comprise:
filtering with respective first and second filter characteristics selected from the group consisting of $$d_{dot}(\lambda_1,\lambda_2,\lambda_3)=|\lambda_3|^2/|\lambda_1|,$$

$$d_{line}(\lambda_1,\lambda_2,\lambda_3)=|\lambda_2|(|\lambda_2|-|\lambda_3|)/|\lambda_1| \text{ and}$$

$$d_{plane}(\lambda_1,\lambda_2,\lambda_3)=|\lambda_1|-|\lambda_2|.$$

17. The method of claim 13, further comprising:
processing at least one of the first and second filtered image data to derive a measure indicative of the presence of said object in said image.

18. The method of claim 17, wherein the step of processing comprises:
determining a region of interest in the image;
extracting at least one feature from the at least one of the first and second filtered image data from within said region of interest; and
applying the at least one extracted feature to at least one classifier configured to output said measure indicative of the presence of said object in said image.

19. The method of claim 18, wherein said step of applying the at least one extracted feature to at least one classifier comprises:
applying the at least one extracted feature to one of an artificial neural network, a Bayesian analyzer, a linear discriminant analyzer, a K-nearest neighbor classifier, and a support vector machine.

20. The method of claim 18, wherein the step of extracting comprises:
extracting a measure of at least one of
a) a size,
b) a shape,
c) a contrast measure,
d) a regularity measure,
e) a circularity measure,
f) a linearity measure,
g) a smoothness measure,
h) a compactness measure,
h) a compactness measure,
i) a standard deviation of at least one of features a) through h), and
j) a mean of at least one of features a) through h).

21. The method of claim 18, wherein said step of extracting comprises:
extracting said at least one feature from kernels centered on respective pixels.

22. The method of claim 18, wherein said step of determining a region of interest comprises:
thresholding at least one of the first and second filtered image data with predetermined threshold data.

23. The method of claim 15, wherein the step of processing the image data comprises:
smoothing the image data with one of a 2-D and a 3-D Gaussian filter.

24. The method of claim 23, wherein the step of smoothing comprises:
smoothing the image data iteratively with a predetermined number of smoothing scales.

25. The method of claim 15, further comprising:
segmenting the image before filtering to derive said image data.

26. The method of claim 25, wherein the step of segmenting comprises:
processing the segmented image with a rolling ball algorithm.

27. The method of claim 14, further comprising:
filtering the image data with a third geometric enhancement filter having magnitude and likelihood filter components to produce third filtered image data in which a third geometric pattern in the image is enhanced, said third geometric pattern being different from the first and second geometric patterns.

28. The method of claim 27, wherein the steps of filtering the image with first, second, and third geometric enhancement filters comprise:
processing the image data using one of a Hessian matrix and a radial derivative algorithm to produce a set of second derivatives;
selecting three second derivatives ($\lambda_1$, $\lambda_2$, $\lambda_3$) in three orthogonal directions from the set of second derivatives; and
filtering with respective first, second, and third filter characteristics selected from the group consisting of $$d_{dot}(\lambda_1,\lambda_2,\lambda_3)=g_{dot}(\lambda_1,\lambda_2,\lambda_3)k_{dot}(\lambda_1,\lambda_2,\lambda_3),$$

$$d_{line}(\lambda_1,\lambda_2,\lambda_3)=g_{line}(\lambda_1,\lambda_2,\lambda_3)k_{line}(\lambda_1,\lambda_2,\lambda_3) \text{ and}$$

$$d_{plane}(\lambda_1,\lambda_2,\lambda_3)=g_{plane}(\lambda_1,\lambda_2,\lambda_3)k_{plane}(\lambda_1,\lambda_2,\lambda_3).$$

29. The method of claim 28, wherein the steps of filtering with first, second, and third filter characteristics comprise:
filtering with respective first, second, and third filter characteristic selected from the group consisting of $$d_{dot}(\lambda_1,\lambda_2,\lambda_3)=|\lambda_3|^2/|\lambda_1|,$$

$$d_{line}(\lambda_1,\lambda_2,\lambda_3)=|\lambda_2|(|\lambda_2|-|\lambda_3|)/|\lambda_1| \text{ and}$$

$$d_{plane}(\lambda_1,\lambda_2,\lambda_3)=|\lambda_1|-|\lambda_2|.$$

30. The method of claim 27, further comprising:
processing at least two of the first, second, and third filtered image data to derive a measure indicative of the presence of said object in said image.

31. The method of claim 30, wherein the step of processing comprises:
determining a region of interest;
extracting at least one feature from each of the at least two of the first, second, and third filtered image data from within said region of interest to produce respective extracted features; and
applying the extracted features to at least one classifier configured to output said measure indicative of the presence of said object in said image.

32. The method of claim 31, wherein said step of applying the extracted features comprises:
applying the extracted features to one of an artificial neural network, a Bayesian analyzer, a linear discriminant analyzer, a K-nearest neighbor classifier, and a support vector machine.

33. The method of claim 31, wherein the step of extracting comprises:
extracting a measure of at least one of
a) a size,
b) a shape,
c) a contrast measure,
d) a regularity measure,
e) a circularity measure,
f) a linearity measure,
g) a smoothness measure,
h) a compactness measure,
h) a compactness measure,
i) a standard deviation of at least one of features a) through h), and
j) a mean of at least one of features a) through h).

34. The method of claim 31, wherein said step of extracting comprises:
extracting at least one feature from kernels centered on respective pixels.

35. The method of claim 31, wherein said step of determining a region of interest comprises:
thresholding at least one of the first, second, and third filtered image data with predetermined threshold data.

36. The method of claim 28, wherein the step of processing the image data comprises:
smoothing the image data with one of a 2-D and a 3-D Gaussian filter.

37. The method of claim 36, wherein the step of smoothing comprises:
smoothing the image data iteratively with a predetermined number of smoothing scales.

38. The method of claim 27, wherein at least one of the steps of filtering further comprising:
segmenting the image before filtering to derive said image data.

39. The method of claim 38, wherein the step of segmenting the image comprises:
processing the segmented image with a rolling ball algorithm.

40. A system configured to implement the method in any one of claims 1–3 and 6–5.

41. A computer program product storing instructions for execution on a computer system, which when executed by the computer system, causes performance of the method recited in any one of claims 1–3 and 6–5.

* * * * *